Oct. 16, 1962  M. J. FEIRING  3,058,484
ROTARY BALL VALVE HAVING ADJUSTABLE SEATS
Filed March 6, 1961
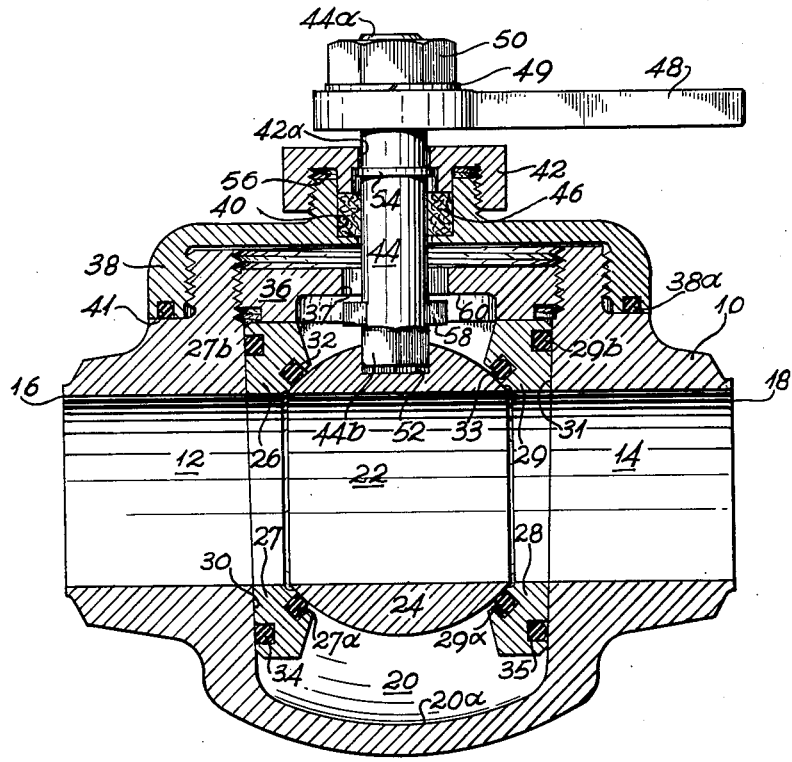
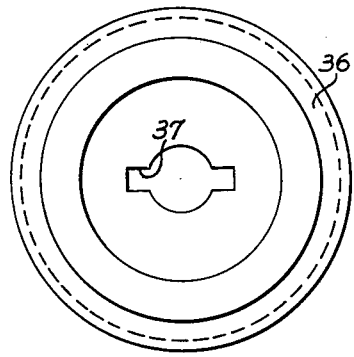
Monroe J. Feiring
INVENTOR.
BY

United States Patent Office 3,058,484
Patented Oct. 16, 1962

3,058,484
ROTARY BALL VALVE HAVING ADJUSTABLE SEATS
Monroe J. Feiring, Kent County, R.I.
(994 Cowessett Road, Warwick, R.I.)
Filed Mar. 6, 1961, Ser. No. 93,438
5 Claims. (Cl. 137—328)

This invention relates generally to ball valves and more particularly to ball valves having means for increasing, without disassembling the valve, the sealing contact pressure between the seat seals of the valve and the ball and valve housing.

Many ball valve designs have been heretofore proposed; however, all of them have a common drawback in that they fail to provide, without disassembling the valve, a means for compensating for the loss of sealing contact pressure between the seat seals and the ball and valve housing which occurs as a result of the seat seals' sealing surfaces wearing away during operation of the valve. The loss of sealing contact pressure is critical since it increases the tendency of the valve to leak where smaller differential pressures across the ball are encountered. The problem is further complicated since many of the valves cannot be disassembled without first removing them from the system.

The main object of this invention is to provide a ball valve having a means for increasing the sealing contact pressure between the valve's seat seals and the ball and valve housing without the necessity of disassembling the valve or removing it from the piping system.

Another object of this invention is to provide a ball valve having adjustable means for increasing, without disassembling the valve, the sealing contact pressure between the seat seals and the ball and the housing, said seat seals being mounted on opposed annular surfaces which diverge in the direction toward the opening in the valve housing through which said seat seals are inserted.

A further object of this invention is to provide a top loaded, easy to assemble and to disassemble ball valve which can be repaired and maintained without removing same from a piping system.

A still further object of this invention is to provide a top loaded, easy to assemble and to disassemble ball valve which can be repaired and maintained without removing same from a piping system and which has adjustable means for increasing, without disassembling the valve, the sealing contact pressure between the seat seals and the ball and valve housing, said seat seals being mounted on opposed annular surfaces which diverge in the direction toward the opening in the top of the valve through which said seat seals are inserted.

The foregoing and other objects and advantages will become more apparent from the specification and drawings. In the drawings, wherein like reference characters indicate corresponding parts throughout the several views:

FIGURE 1 is a longitudinal sectional view of one embodiment of the valve structure according to the present invention;

FIGURE 2 is a plan view of the adjustable, generally cylindrical member.

Referring now to the drawing, particularly FIGURE 1, the valve structure comprises a generally cylindrical single-piece housing 10 made of suitable material, such as stainless steel, which has two cylindrical or generally cylindrical fluid passages 12 and 14. The outer ends 16 and 18 of said fluid passages are machined to permit welding of the valve in a pipe line (not shown). Said ends may, however, be internally or externally threaded, flanged or have any other suitable end connection as desired.

The fluid passages 12 and 14 communicate with a central space 20 in the housing 10. The fluid passages 12 and 14 also communicate with a passage 22 in the annular valve ball 24 which is mounted in central space 20 between two seat seals 26 and 28.

The central space 20 extends through one side of the housing 10 and has a longitudinal axis disposed transversely to the longitudinal axis of said fluid passages 12 and 14. The walls defining said central space 20 include oppositely disposed annular surfaces forming seat seal retaining surfaces 30 and 31. Each of said surfaces 30 and 31 are positioned adjacent to a respective one of said fluid passages 12 and 14 and have an opening therethrough defining, respectively, an upstream and downstream passage. Said surfaces 30 and 31 extend into a recessed portion 20a of the central space 20 and are formed divergent in the direction toward the opening in the housing 10.

Each of said seat seals 26 and 28 comprises an annular retaining ring 27, 29 and an annular sealing member 32, 33. The annular sealing member 32, 33, which may be an O ring, is positioned within a groove 27a, 29a formed in the retaining ring's surface positioned adjacent to the ball 24. An O ring 34, 35 is positioned in the annular groove 27b, 29b formed on the retaining ring 27, 29 and seals against leakage between the seat seal retaining surface 30, 31 and the retaining ring 27, 29.

A removable, adjustable, generally cylindrical member 36 having a vertical, splined bore 37 is threaded into the opening in the valve housing 10. A removable bonnet 38 having a vertical bore 40 is threaded onto the wall of the housing 10. An O ring 41 is positioned in an annular groove 38a formed in the bonnet 38 and seals against leakage between said bonnet 38 and housing 10. A packing nut 42 having a vertical bore 42a is threaded onto the bonnet 38. Positioned within the vertical bore 40 of the removable bonnet 38 are a stem 44 and a stem seal 46. One end 44a of said stem 44 projects upward through said bonnet 38 and through said packing nut 42 and has a handle attached thereto by a lock washer 49 and a removable nut 50. The other end 44b of said stem 44 projects downward through the splined bore 37 of member 36 and is positioned within a socket 52 formed on the top of ball 24. The stem 44 has a snap ring 54 or, depending on the type of stem seal 46 used, a boss which in the valve's normally assembled condition abuts against the lower surface 56 of packing nut 42. Stem 44 also has a splined portion 58 which in the valve's normally assembled condition is positioned between the top of ball 24 and the lower surface 60 of member 36.

Stops (not shown) included as an integral part of the housing 10 cause interference with a portion (not shown) of the handle 48 as said handle is rotated to position the ball 24. Said stops are positioned such that interference with the handle occurs when the fluid passage 22 within the ball 24 is aligned with the fluid passages 12 and 14 (open position) and when said fluid passage 22 within said ball 24 extends across said fluid passages 12 and 14 (closed position).

An important aspect of this invention concerns the incorporation within a ball valve of member 36 and means to adjust, without disassembling the valve, said member 36 in order that member 36 will exert upon seat seals 26 and 28 a force in the downward direction. When the seat seals 26 and 28 have a force exerted on them in this manner they converge towards each other as they move down the canted seat seal retaining surfaces 30 and 31 into the recessed portion 20a of central space 20. This movement of the seat seals results in an increased sealing contact pressure between the seat seals and the ball and the housing.

Adjustment of member 36 is accomplished as follows. Since upward movement of the stem 44 is limited by the snap ring 54 abutting against the lower surface 56 of packing nut 42, the packing nut must be unscrewed or backed off a sufficient distance to permit the splined portion 58 of stem 44 to move upward into the splined bore 37 of member 36. Unless the splined portion 58 of stem 44 is perfectly aligned with the splined bore 37 of member 36, the stem 44 will have to be rotated until said parts are in alignment. In order to prevent unnecessary movement of the ball 24, the stem 44 preferably should be disengaged from the socket 52 formed on the top of ball 24 before said parts are brought into alignment. With the splined portion 58 of stem 44 positioned within the splined bore 37 of member 36, the stem 44 is rotated in the proper direction to thread said member 36 deeper into central space 20. Rotation of member 36 is continued until the proper amount of sealing contact pressure between the seat seals and the ball and housing is imposed. Although a torque wrench may be used to measure the proper amount of imposed sealing contact pressure, a skilled operator can without the use of any special equipment easily determine when the proper amount of sealing contact pressure has been imposed therebetween. Following the tightening of member 36, the stem 44 is moved downward and rotated until it drops into socket 52 formed on top of ball 24. The packing nut is then tightened down and the valve is ready for use.

The valve is assembled as follows. First, the seat seals are assembled. Seat seal 26 is assembled by positioning the annular sealing member 32 in the groove 27a formed in the retaining ring 27 and placing the O ring 34 on shoulder 27b formed on said retaining ring 27. Seat seal 28 is assembled in a like manner. The ball 24 is positioned between seat seals 26 and 28 with the spherical portions thereof in contact with the annular sealing members 32 and 33 of seat seals 26 and 28, respectively. The seat seal-ball unit is inserted through the opening in the housing 10. Next, member 36 is threaded into the housing 10 until the proper amount of preload or sealing contact pressure exists between the seat seals and the ball and housing. The stem seal 46 is then placed over end 44a of the stem 44. The snap ring 54 is then placed on stem 44 and the stem's end 44b and splined portion 58 are passed through the splined bore 37 of member 36 until the stem's end 44b is positioned in the socket 52 formed on the top of ball 24. The packing nut 42 is threaded onto the bonnet 38 and the O ring 41 is positioned in groove 38a formed in said bonnet 38. The packing nut-bonnet unit is then slipped over the stem's end 44a and threaded onto the housing 10. The handle 48 is then slipped over the end 44a of the stem and is secured in place with a lock washer 49 and nut 50. The valve is now completely assembled and ready for installation in a pipe line. Disassembly thereof may be accomplished without the necessity of first removing same from said pipe line, by reversing the steps outlined above.

It will be readily appreciated that an inexpensive ball valve simple in design and having a unique adjustable means to compensate for the loss of sealing contact pressure between the seat seals and the ball and housing has been described. As a result of the incorporation of this adjustable means, the maintenance problems have been considerably decreased while the operating life of a valve of this design has been substantially increased.

It is to be understood that this invention is not limited to the exact embodiment of the device shown, which is merely by way of illustration and not limitation, as various other forms and modifications will be apparent to those skilled in the art without departing from the spirit of the invention and scope of the claims.

I claim:
1. A valve, comprising a housing having a central space and a pair of generally cylindrical longitudinally aligned end passage each communiciating with said central space and the exterior of said housing, said housing having a generally cylindrical opening through one side thereof and communicating with said central space and an internal recessed portion in the side thereof directly opposite said opening, the axis of said opening being transverse to the axis of said end passages, said central space having oppositely disposed annular walls forming seat seal retaining surfaces, each said surface being adjacent to a respective one of said end passages and having an opening therethrough, said annular walls diverging in the direction toward said opening in said housing; an annular ball positioned in said central space, said ball having part spherical faces and adapted to be aligned with said end passages to provide communication between said end passages in one rotational position of said ball and to be out of alignment with said end passages to prevent communication between said end passages in another rotational position of said ball; a pair of seat seals each mounted on a respective one of each seat seal retaining surface and having said ball disposed therebetween; means including a valve stem to turn the ball for any position thereof, said valve stem having a splined portion and a boss portion; and adjustable means including a generally cylindrical member to urge said seat seals into the internal recessed portion positioned opposite said opening in said housing thereby increasing the sealing contact pressure between said seat seals and the ball and seat retaining surfaces and compensating for the loss of sealing contact pressure therebetween which results from the wearing away of the seat seals' sealing surface, said generally cylindrical member being threadably mounted in the opening in the housing and having a splined opening therethrough to receive the splined portion of said valve stem.

2. A valve, comprising a housing having converging inside walls, a pair of generally cylindrical longitudinally aligned end passages each leading from a respective one of said inside walls, an annular valve ball within said housing, said ball including a passage adapted to be aligned with said end passages and to be rotated transverse to the end passages to establish open and closed positions for the valve, adjustable seat seals disposed adjacent said end passages and arranged to cooperate with said housing and ball to form a tight seal, adjustable means including a translatable, rotatable valve stem cooperating with a threadably mounted, generally cylindrical member to urge said seat seals in the direction of convergence along said converging inside walls, said valve stem having a splined portion, said generally cylindrical member having a splined opening therethrough in which is positioned said valve stem, and means including said valve stem to turn said ball for any position thereof.

3. A valve constructed in accordance with claim 2 in which said adjustable means includes a threadably mounted packing nut in said housing and a translatable, rotatable valve stem cooperating with a threadably mounted, generally cylindrical member to urge said seat seals in the direction of convergence along said converging inside walls, said threadably mounted packing nut having an opening therethrough and through which said stem extends, said valve stem having a splined portion and a boss portion, the translatory movement of said valve stem in one direction being limited by the abutting of said boss portion of said valve stem against said threadably mounted packing nut, said generally cylindrical member having a splined opening therethrough in which is positioned said valve stem, the splined portion of the valve stem being prevented from normal engagement with the splined opening of the cylindrical member by the valve stem translatory movement limiting means.

4. A valve constructed in accordance with claim 3 in which said valve stem has a splined portion and a snap ring mounted thereon, the translatory movement of said valve stem in one direction being limited by the abutting of said snap ring against said threadably mounted packing nut.

5. A valve comprising a housing having converging inside walls, a pair of generally cylindrical longitudinally aligned end passages each leading from a respective one of said inside walls, an annular valve ball within said housing, said ball including a passage adapted to be aligned with said end passages and to be rotated transverse to the end passages to establish open and closed positions for the valve, adjustable seat seals disposed adjacent said end passages and arranged to cooperate with said housing and ball to form a tight seal, translatable valve stem means releasably engaging the ball in drive relationship to turn the ball between the open and closed positions, and adjustable means engaging said seat seals, said adjustable means being adapted to selective drive engagement by the valve stem means to urge said seat seals in the direction of convergence along said converging inside walls.

References Cited in the file of this patent
UNITED STATES PATENTS

| | | |
|---|---|---|
| 1,941,839 | Johansson | Jan. 2, 1934 |
| 2,063,699 | Schellin | Dec. 8, 1936 |
| 2,813,695 | Stogner | Nov. 19, 1957 |

FOREIGN PATENTS

| | | |
|---|---|---|
| 403,389 | Great Britain | Dec. 18, 1933 |